(12) United States Patent
Ross et al.

(10) Patent No.: US 6,970,817 B2
(45) Date of Patent: Nov. 29, 2005

(54) METHOD OF ASSOCIATING VOICE RECOGNITION TAGS IN AN ELECTRONIC DEVICE WITH RECORDS IN A REMOVABLE MEDIA FOR USE WITH THE ELECTRONIC DEVICE

(75) Inventors: Douglas Eugene Ross, Davie, FL (US); Naraharisetti Venkata Srikanth Siddardha, Machilipatnam (IN); Daniel Jose Landron, Plantation, FL (US); Mahesh B. Bhuta, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 568 days.

(21) Appl. No.: 09/999,120

(22) Filed: Oct. 31, 2001

(65) Prior Publication Data

US 2003/0083873 A1 May 1, 2003

(51) Int. Cl.⁷ ........................ G10L 19/00; G10L 15/00; G06F 17/30; G06F 12/00; G06F 3/00
(52) U.S. Cl. .......................... 704/201; 704/231; 707/1; 711/115; 710/13
(58) Field of Search ......................... 707/1, 2; 710/13; 711/115; 369/88.01; 704/201, 270, 270.1, 704/231

(56) References Cited

U.S. PATENT DOCUMENTS

| | | | | |
|---|---|---|---|---|
| 5,613,097 A | * | 3/1997 | Bates et al. | 707/3 |
| 5,832,213 A | * | 11/1998 | Duncan | 713/202 |
| 5,857,099 A | * | 1/1999 | Mitchell et al. | 704/235 |
| 5,960,447 A | * | 9/1999 | Holt et al. | 715/500 |
| 6,308,268 B1 | * | 10/2001 | Audebert | 713/182 |
| 6,370,545 B1 | * | 4/2002 | Shaath | 707/200 |
| 6,400,805 B1 | * | 6/2002 | Brown et al. | 379/88.01 |
| 6,658,496 B1 | * | 12/2003 | Minakata et al. | 710/5 |
| 6,775,648 B1 | * | 8/2004 | Boldl | 704/201 |
| 6,839,712 B1 | * | 1/2005 | Kumhyr et al. | 707/101 |
| 6,862,617 B1 | * | 3/2005 | Wu | 709/224 |
| 2004/0059884 A1 | * | 3/2004 | Iwasaki | 711/163 |
| 2004/0107422 A1 | * | 6/2004 | Cabrera et al. | 719/310 |
| 2005/0044417 A1 | * | 2/2005 | Carpentier et al. | 713/201 |

FOREIGN PATENT DOCUMENTS

EP            472193 A2 *   2/1992   ........... G10L 03/00

* cited by examiner

Primary Examiner—W. R. Young
Assistant Examiner—Matthew J. Sked
(74) Attorney, Agent, or Firm—Scott M. Garrett

(57) ABSTRACT

A device (102) that can perform voice recognition operates with a removable media or memory (104) that is used to store information records (126). To save memory space in the removable media, voice recognition tags (118), used to perform voice recognition, are not stored in the removable media, but are stored in the device. Since the media is removable, the device must check to make sure the records stored in the media are usable with the voice recognition tags. This is accomplished by generating a key (306) whenever a new voice recognition tag is trained (304). The key is stored in the device, or in the media, or both. Upon initialization of the device, (202), the device searches (206) the media for records and checks (210) to see if the key corresponding to the record matches any keys in the device. When a match is found the record is associated (214) with the corresponding voice recognition tag. Voice recognition tags with no corresponding records are deleted or ignored. When a record with no corresponding voice recognition tag is found, the device may prompt the user to train a new voice recognition tag (218) for the record.

14 Claims, 2 Drawing Sheets

METHOD OF ASSOCIATING VOICE RECOGNITION TAGS IN AN ELECTRONIC DEVICE WITH RECORDS IN A REMOVABLE MEDIA FOR USE WITH THE ELECTRONIC DEVICE

TECHNICAL FIELD

This invention relates in general to devices which utilize voice recognition for accessing data, and more particularly to devices which utilize voice recognition to access data stored in a removable media, such as a subscriber identity module.

BACKGROUND OF THE INVENTION

A number of portable devices now permit users of such devices to store records in removable media. At the same time, voice recognition technology has advanced to a point where it is not uncommon in relatively inexpensive devices. Typically voice recognition technology is employed to command the device to perform some task, which may include accessing a data record in the removable storage media.

Because these devices are typically used by one individual, the data stored on the removable media is personal, and may include contact information such as calling numbers and addresses, and calendar or schedule information for the user. However, the amount and type of information stored on the removable media is usually small because of the expense of the removable media. In order to perform voice recognition assisted access of the information stored on the removable media, the device must learn to recognize a spoken command of the particular user. Learning a particular command is known as training, and the data produced in the process that is used by the voice recognition system is substantial compared to the records stored on the removable media. It would be impractical to store this training data, or voice recognition tags, on the removable media. Therefore it is common to store the voice recognition tags in the device, for example in non-volatile memory.

Because the media on which the users records are stored is removable, and usable with other similar devices, it is not uncommon for a user to use the media with a different device. This may occur, for example, when the user obtains a new device. This presents a problem when voice recognition is involved because the voice recognition tags are stored in the device that trained the tags, and not on the media. Therefore, when the media is used with a new device, the user no longer has the benefit of the voice recognition tags.

An example of such a device in common use is a cellular radiotelephone having a subscriber identity module (SIM) for storing calling numbers and names or aliases associated with the calling numbers. This arrangement is standard in mobile phones operated in accordance with the Global Specification for Mobile (GSM) communications. The SIM contains numbers the user programs into the SIM. In some such phones, the information in the SIM is copied into a memory in the phone for faster access. With these phones, as well as other devices that operate with removable media, if voice recognition tags are used and associated with information on the SIM, a problem arises when the media or SIM is used in another device. Therefore a need exists for a method by which voice recognition tags can be properly associated with records stored in the removable media.

DETAILED DESCRIPTION OF A PREFERRED EMBODIMENT

Figure 1:
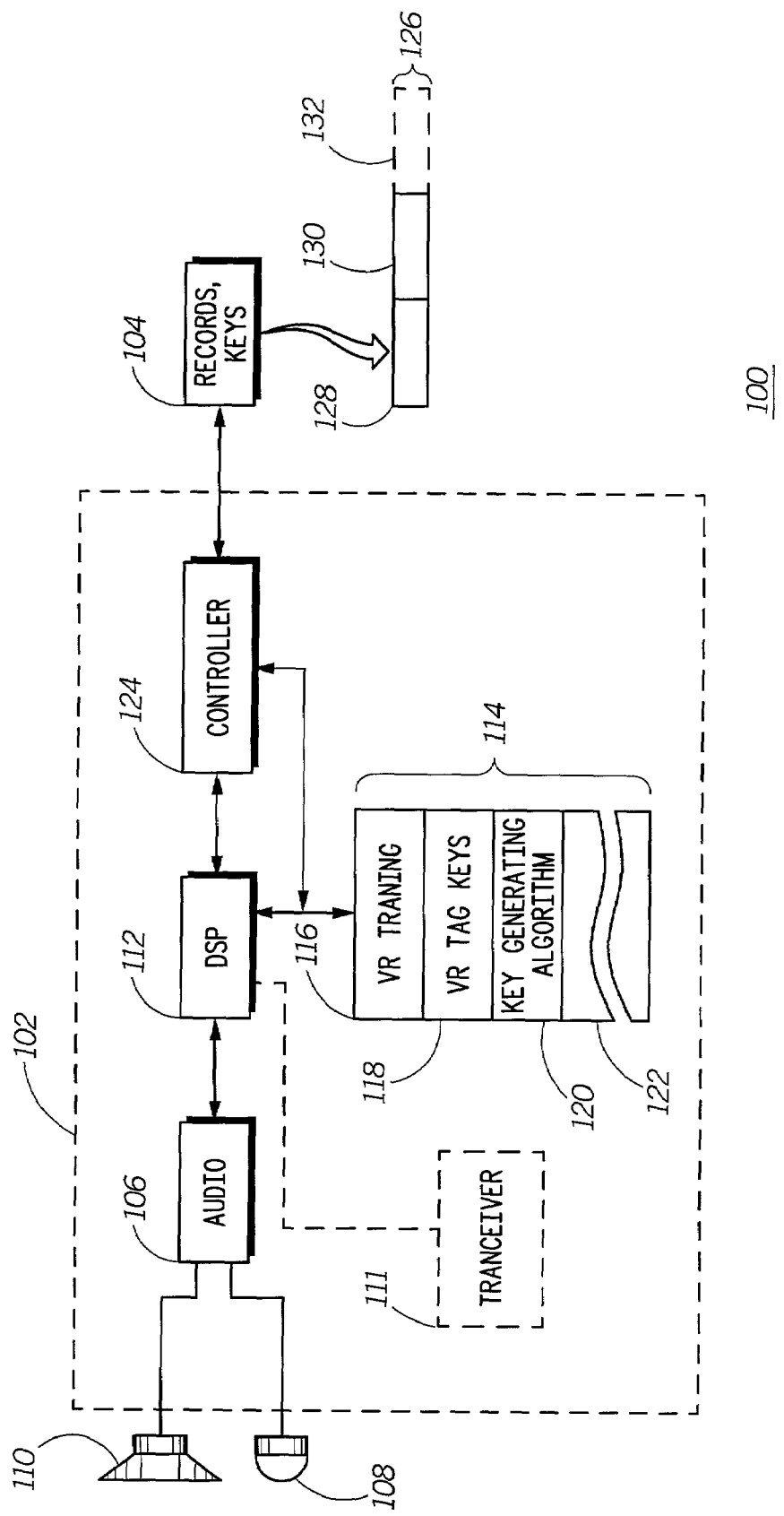
FIG. 1 shows block diagram of a device and a removable media for use with the device, in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of associating voice recognition (VR) tags with data records in a removable media by using a digital key based on the data record. The key is either stored with the data record in the removable media, or it can be generated as the removable media is scanned. A copy of the key is stored in the device and is associated with the proper VR tag. As the media is scanned, each key found in the media or generated upon reading a data record is compared to keys in the device in order to determine if there is a match. If a match is found the VR tag corresponding to the key is associated with the data record.

Referring now to FIG. 1, there is shown a block diagram 100 of a device 102 and a removable media 104 for use with the device, in accordance with the invention. The removable media may be, for example, a memory stick for use with a personal digital assistant, or a digital camera, or it may be a subscriber identity module (SIM) for use with a mobile communication device. In order to perform voice recognition functions, the device comprises an audio circuit 106 for processing audio signals received via a microphone or audio transducer 108. The device may also be provided with a speaker 110 for playing sounds, or other audio signals such as audio signals received from a transceiver 111 which may also be included in the device if so required for operation, as in the case when the device is a mobile communication device. The audio circuit comprises filters and amplifiers as is known in the art, and may also included an analog to digital converter or a digital to analog converter, or both. The audio circuit is operably coupled to a signal processor, such as a digital signal processor (DSP) 112, for performing voice recognition. The DSP may be a dedicated processor, designed exclusively for voice recognition, or it may be a general processor which executes code designed in accordance with voice recognition principles. The DSP is operably coupled to a memory 114, or the memory may be included within the DSP. The memory 114 is used to store executable code and data for use by the DSP in performing voice recognition, and includes voice recognition training algorithms 116, VR tags and keys 118 produced upon performing VR training, and a key generating algorithm 120. Other code 122 may also be included for other functions, as dictated by the particular application for which the device 102 is designed. A controller 124 interfaces with the DSP and provides data and control messages to the DSP. The controller 124 also interfaces with the removable media 104, and may have direct access to the memory 114, or may have its own memory.

The removable media 104 contains data records accessible by the device, and for use with the device. The data records may be contact information, such as phone numbers and names associated with the phone numbers, or other contact information, for example. Numerous types applications exist for which various types of information would be stored on the media. As an example, in a SIM for use with a cellular phone, a typical record 126 would include a phone number field 128, and preferably a name or alias field 130. Additionally, if space permits, a digital key field for storing a digital key corresponding to the record may be included, although it is not a standard field under the GSM specification.

The digital key, or simply key, is substantially unique, and generated when a data record is created by the user. Preferably it is based on the data record itself, i.e. at least one of the data fields, and more preferably it is based on the entire record. However, other methods such as pseudo-random number generation, for example may also be used. The key may be a simple string, or the key generating algorithm may be a cryptographic algorithm, producing a key that is a cryptographic hash of the data record, for example. When the key is first generated, a copy is stored in the device, and associated with a VR tag. The key may also be stored in the removable media if the application permits. If the key is not stored in the media, then the key must be based on record so that it can be generated later, and matched to the key stored in the device.

Figure 2:
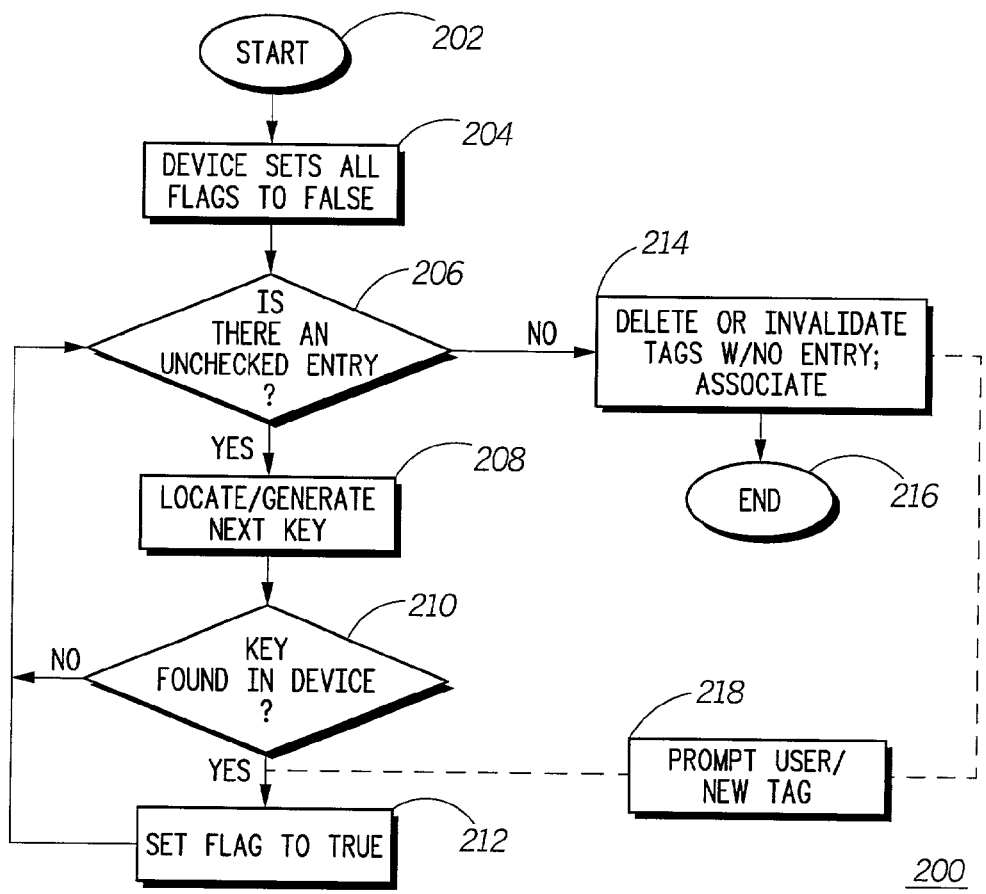
FIG. 2 shows a flow chart diagram of a method of associating voice recognition (VR) tags in a device with data records stored in a removable media for use with the device.

Referring now to FIG. 2, there is shown a flow chart diagram 200 of a method of associating voice recognition (VR) tags in a device with data records stored in a removable media for use with the device, in accordance with the invention. At the start 202 of the process, it is assumed that the device has already performed some voice training to produce a VR tag. Accordingly the VR tag is provided and stored in the device. Since the VR tag is generated in response to the creation of a data record, it is assumed that a first key corresponding to the VR tag has also been generated and provided in the device. The method generally begins upon initialization of the device, such as upon powering on the device, or otherwise resetting the device. To simplify the process, each VR tag can be provided with a flag that can be set to true of false, and begin the process of checking by setting all the flags to false (204). The device then commences searching the removable media for data records by checking (206) to see if there are any unchecked entries in the media. Is there is an unchecked record in the media, the device locates the record in the media. Upon locating the data record, the device locates the key field of the record, or if no key field is used, the device commences generating a second key based on the data record, using the key generating algorithm. In the course of searching the media, wherein the data records comprise at least two data fields, generating the key is based on at least one of the data fields, and preferably the entire record. If the first key, stored in the device, matches the second key (210), then the record has a corresponding VR tag stored in the device. The device then commences associating the data record with the VR tag so that when the VR tag is invoked the data record is accessed.

The associating can be done in a variety of ways, such as recording the media address of the record in the device at a location corresponding to the particular VR tag. Alternatively, it is sometimes the case that, upon initialization of the device, some or all of the records may be copied into the device for faster access. If that is the case, then the device can note the memory location of the record once it is loaded into the device, and note that location with the VR tag so that when the VR tag is invoked, the device will access the corresponding data record. In one embodiment of the invention, the device simply sets the flag corresponding to the VR tag to "true," then when there are no more records to check, the device can delete or inactivate VR tags with corresponding records in the media, and associate those that have corresponding records with the VR tag for which they are intended to be used (214). The process ends (216) one of two ways, normally. The process can be performed by reading media, and looking for matches in the device, or vice-versa. Either way, if there is a record with no corresponding VR tag, the process can optionally further include prompting the user to create a new VR tag for the record (218).

Normally the method of associating VR tags with data records is performed upon powering up the device, in the case where the device is a mobile communication device, the searching is performed after over-the-air programming of the mobile communication occurs. Over-the-air programming sometimes necessitates re-initialization of the mobile communication device, so the process must be performed upon the "reboot" of the mobile communication device. This would also include when the device is, for example, connected to a computer so that it may be reprogrammed, or otherwise reconfigured.

After the associating of VR tags with corresponding data records is finished, the device can access the appropriate record upon a voice command by the user of the device. For example, in the case where the device is a mobile communication device, the record being a phone number and associated name, the user can speak "call Doug," and the voice recognition algorithm will utilize the voice tag in determining that the record corresponding to "Doug" is the record to be accessed. The mobile communication device then commences accessing the record to obtain the associated phone number from a phone number field of the record, and initiates a phone call to "Doug" using the phone number.

Figure 3:
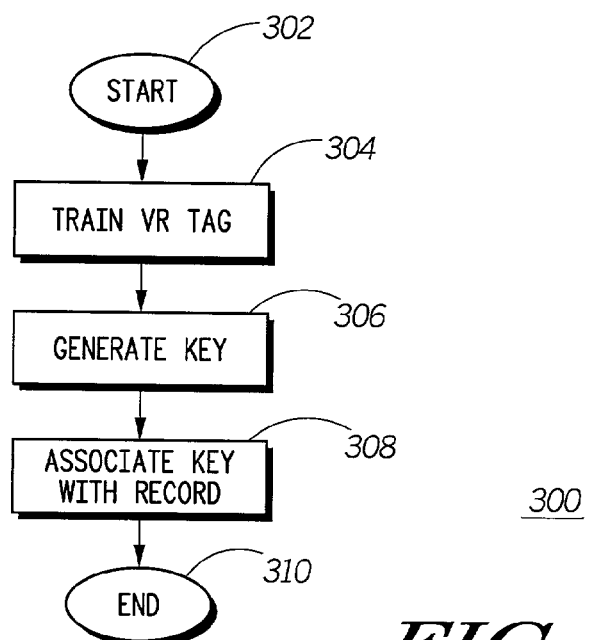
FIG. 3 shows a flow chart diagram of a method of associating a VR tag with a data record, in accordance with the invention.

Referring now to FIG. 3, there is shown a flow chart diagram 300 of a method of associating a VR tag with a data record, in accordance with the invention. When a user wishes to add a record to the memory of the device, or to the removable media, or both, and wishes the record to be accessible by voice command, the user will have to set up the device and record. Accordingly, at the start 302 of creating a new voice accessible record, the user has entered the record information in a typical manner, and the device may, for example, prompt the user to decide if the record is to be voice accessible. If the user wishes to have the record be usable with voice command, the user will have to train a VR tag (304). This is a routine practice in voice recognition technology where the device "learns" the spoken command by analyzing a speech signal when the user speaks the command. The device must also generate a unique key (306) for use with the VR tag and record. As mentioned before, the key generation is accomplished according to a key generating algorithm, and may be performed using cryptographic techniques. If the key is based on the record itself, such as a phone number and name, then the key will be inherently associated with the record, but the key is also stored in the device and associated with the corresponding VR tag. Once the VR tag and key have been generated, and the proper associations made (310), the device can commence using the record in response to a voice command issued by the user of the device. If the device is power cycled (turned off, then back on), the device goes through the earlier discussed method of searching the media for the unique key, and upon locating the unique key in the media, either by generating it or finding it actually stored in the media, associating the record corresponding to the unique key in the media with the VR tag in the device. If a matching key is not found in the device, the VR tag is as invalid, and the VR tag is not used for any voice recognition activity for the present power cycle of device, unless the device is reinitialized without a power cycle, such as when over the air programming occurs. When a non-power cycle reinitialization occurs, VR tags there were not previously associated with any records may become associated with new records downloaded or otherwise recently added.

Thus, generally the invention provides a method of associating data stored in a device with a record stored in a removable media for use with the device. The method is performed upon initialization of the device, and comprises locating a key corresponding to the record, or if there is no key corresponding to the record, generating the key with a key generating algorithm. Once the key is obtained or determined, the device commences determining if the key of the record corresponds to the data stored in the device, and if the key does correspond to the data stored in the device, the device commences associating the record with the data stored in the device. The invention further provides a method for associating records with their corresponding voice recognition tags to be used in voice recognition-assisted functions in a device having records stored on a removable media. The invention solves a problem created by the fact that the media is removable, and when the VR tags ate not stored on the media with the records. This is a problem experienced in, for example, mobile communication devices using SIM memory cards to store phone number records. The method is accomplished by use of a unique key that is generated for each record. The key may or may not be stored in the removable media. It is also contemplated that the key may be generated from the VR tag, and stored in the removable media corresponding to the record in an equivalent manner. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of associating voice recognition (VR) tags in a device with data records stored in a removable media for use with the device, comprising:
    providing in the device a VR tag and a first key corresponding to the VR tag;
    searching the removable media for a data record;
    upon locating the data record, generating a second key based on the data record with a key generating algorithm; and
    if the first key matches the second key, associating the data record with the VR tag so that when the VR tag is invoked the data record is accessed.

2. The method of claim 1, wherein data record comprises at least two data fields, the generating comprises generating a second key based on at least one of the data fields.

3. The method of claim 1, wherein the searching is done upon powering up the device.

4. The method of claim 1, wherein the device is a mobile communication device, the searching is performed after over-the-air programming of the mobile communication occurs.

5. The method of claim 1, wherein the searching, generating, and associating are repeated for at least a second VR tag and data record.

6. The method of claim 1, wherein if upon performing the generating, the second does not match the first key, or any other key associated with any other VR tag, the method rurther comprising flagging the VR tag corresponding to the first key as invalid.

7. A method of associating voice recognition (VR) tags in a mobile communication device with calling number records stored in a subscriber identity module (SIM) for use with the mobile communication device, comprising:
    training a VR tag, the VR tag stored in the mobile communication device and corresponding to a calling number record in the SIM;
    generating a unique key corresponding to the calling number record;
    storing the unique key in the mobile communication device and in the SIM;
    associating the unique key with the VR tag in the device, and with the calling number record in the SIM;
    upon initialization of the mobile communication device, searching the SIM for the unique key; and
    upon locating the unique key in the SIM, associating the calling number record corresponding to the unique key in the SIM with the VR tag in the mobile communication device.

8. The method of claim 7, wherein calling number record comprises at least two data fields, the generating comprises generating the unique key based on at least one of the data fields.

9. The method of claim 7, wherein the searching is done upon powering up the mobile communication device.

10. The method of claim 7, wherein the searching is performed after over-the-air programming of the mobile communication device occurs.

11. The method of claim 7, wherein the generating, storing, associating are repeated for at least a second VR tag, unique key, and calling number record.

12. The method of claim 7, wherein if upon performing the searching, the unique key is not found, the method further comprising:
    flagging the VR rag corresponding to the unique as invalid; and
    not using the VR tag for any voice recognition activity for a present power cycle of the mobile communication device.

13. A method of associating a voice recognition (VR) tag in a mobile communication device with a calling number record in a subscriber identity module (SIM), comprising:
    initializing the mobile communication device;
    locating in the SIM the calling number record;
    locating a unique key corresponding to the calling number record in the SIM, or if there is no unique key corresponding to the calling number record, generating the unique key with a key generating algorithm based on the calling number record;
    searching in a memory of the mobile communication device for a key matching the unique key;
    upon not finding a key matching the unique key, prompting a user of the mobile communication device to train a new VR tag;

training the new VR tag; and associating the new VR tag with the calling number record.

14. A method of associating a voice recognition (VR) tag in a mobile communication device with a calling number record in a subscriber identity module (SIM), comprising:

initializing the mobile communication device;

locating in the SIM the calling number record;

locating a unique key corresponding to the calling number record in the SIM, or if there is no unique key corresponding to the calling number record, generating the unique key with a key generating algorithm based on the calling number record;

searching in a memory of the mobile communication device for a key matching the unique key;

locating a matching key in the mobile communication device, the matching key corresponding to a VR tag; and associating the VR tag with the calling number record in the SIM.

* * * * *